Figure 1:
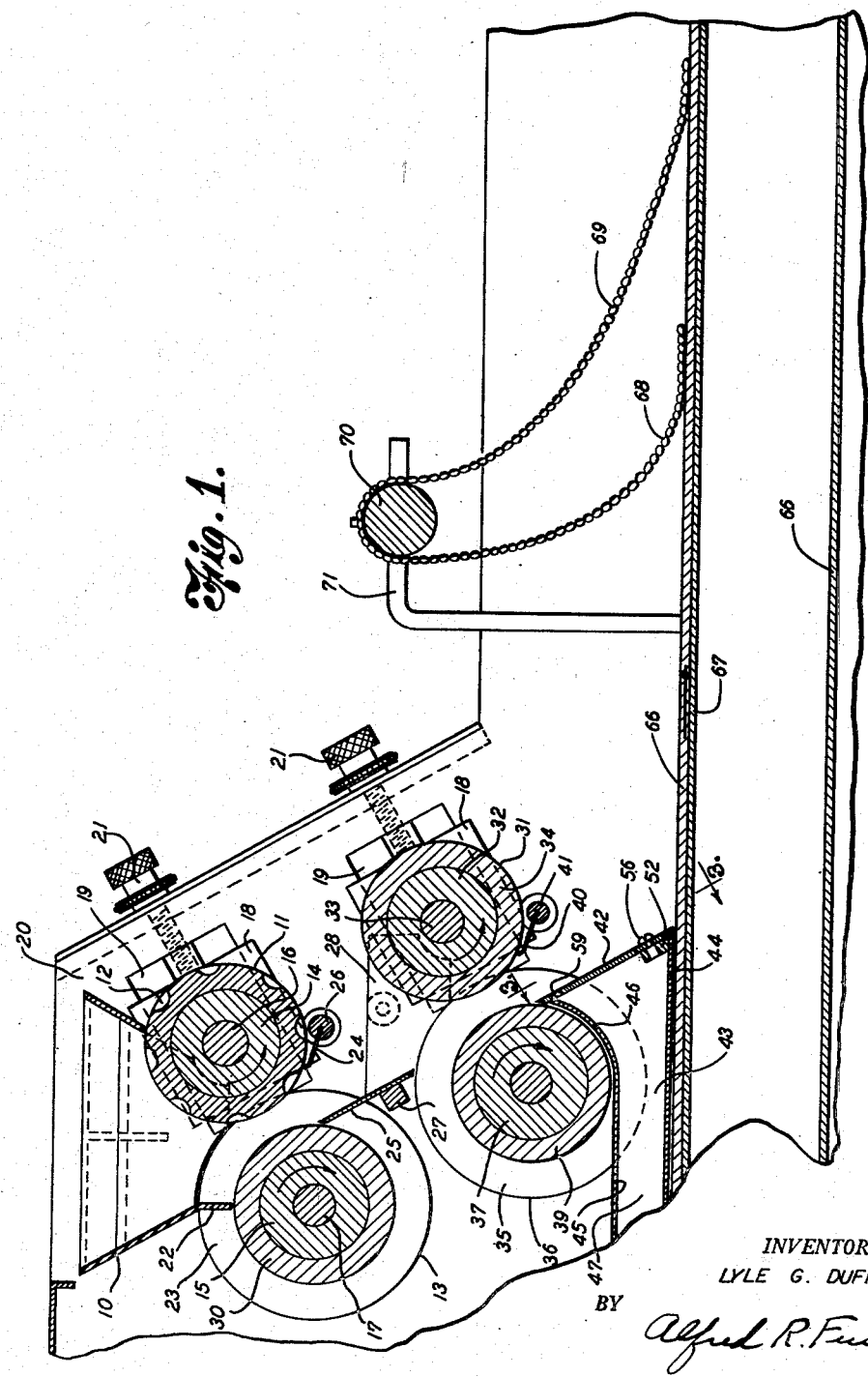

Aug. 31, 1954

L. G. DUFFY 2,687,698

SHEETED DOUGH GUIDING MEANS FOR MOLDERS

Filed Aug. 5, 1949

2 Sheets-Sheet 1

INVENTOR.
LYLE G. DUFFY
BY
Alfred R. Fuchs
ATTORNEY

Aug. 31, 1954 L. G. DUFFY 2,687,698
SHEETED DOUGH GUIDING MEANS FOR MOLDERS
Filed Aug. 5, 1949 2 Sheets-Sheet 2

INVENTOR.
LYLE G. DUFFY
BY
Alfred R. Fuchs
ATTORNEY

Patented Aug. 31, 1954

2,687,698

UNITED STATES PATENT OFFICE 2,687,698

SHEETED DOUGH GUIDING MEANS FOR MOLDERS

Lyle G. Duffy, Milwaukee, Wis., assignor to Stickelber and Sons, Inc., Kansas City, Kans., a corporation of Missouri Application August 5, 1949, Serial No. 108,850

6 Claims. (Cl. 107—12)

My invention relates to bread molding machines, and more particularly to a guide for directing sheeted dough pieces from a sheeting mechanism onto a conveyor belt in a bread molding machine.

In a bread molding machine it is highly desirable to avoid the use of dusting flour in the sheeting mechanism and on the sheeted piece of dough before it is curled or coiled up on itself to form the loaf. In sheeting a rounded piece of dough in a bread molding machine it is ordinarily sheeted between at least two pairs of rollers, passing first between a pair of sheeting rollers that are spaced apart a certain distance to give a relatively thick sheet-like form to the rounded dough piece and then between a second pair of sheeting rollers that are set much more closely together to sheet the piece of dough to the desired thickness for curling or coiling up into a form that will produce a loaf of bread. The two or more sheeting operations are carried out to de-gas the dough piece. Gas has been produced due to the fermentation process that has been taking place in the rounded piece of dough, and in order to produce a fine even grain in the baked loaf it is desirable to press all of the accumulated gas out of the dough piece, this preventing the formation of gas pockets, resulting in large holes in the baked loaf of bread. The number of sheeting operations that are performed and the extent to which the dough is reduced in thickness depends upon the desires of the particular baker, but at least two sheeting operations are carried out as above set forth and the sheeted piece of dough passing from the last pair of rollers is reduced in thickness so that it is more than one-eighth of an inch thick and, preferably, thinner.

Such a thinly sheeted piece of dough is very flexible because of its thinness, and also is sticky on its surface because the moisture has been squeezed out of the interior of the dough piece along with the gas. In order to prevent sticking of such a dough piece to rollers in ordinary bread molding machines, it has been necessary to use large quantities of dusting flour, which has resulted in white streaks in the finished loaf of bread after the same has been baked, which in a slice of bread would appear substantially as a spiral white streak throughout the face of the slice. In order to avoid such white streaks, it is highly desirable to do the sheeting of the dough without application of any dusting flour thereto and to avoid the application of dusting flour to the sheeted dough piece until after it has been curled up on itself so that the contacting areas of the rolled up or curled up piece of dough will be sufficiently sticky that these surfaces will readily adhere to each other, thus avoiding any voids in the baked loaf of bread, as well as the white streaks.

While in the use of dough sheeting mechanism employing rollers that are provided with surfaces that are made of certain plastic materials, such as disclosed in the application of Merlin A. Sticelber, Serial No. 793,359, filed December 23, 1947, on Dough Sheeting Apparatus and Method, the use of dusting flour to prevent sticking of dough to the sheeting rollers is not necessary, but it has been found that particularly after the last sheeting operation the sheeted dough pieces have surfaces that are so sticky that it has been necessary to apply dusting flour to these to prevent sticking of the same to deflecting or guiding means for directing the dough pieces onto a conveyor belt or similar means to which the sheeted dough pieces are fed before being curled or coiled up on themselves to form the loaf.

It is the principal purpose of my invention to provide means for guiding or deflecting sheeted dough pieces from sheeting mechanism to other mechanism, such as curling mechanism utilizing a conveyor belt or any other suitable means, which deflecting or guiding means is so constructed and arranged that no dusting flour whatsoever has to be applied thereto, to prevent the dough from sticking to said deflecting or guiding means or to said conveyor belt, and also no dusting flour has to be applied to the dough piece that has been sheeted, or during the sheeting operation to prevent such sticking to the deflecting or guiding means above referred to. Thus the use of dusting flour can be entirely eliminated during the sheeting of the dough pieces and prior to curling or coiling the sheeted dough piece to form a loaf.

When a dough piece is sheeted to the thinness above referred to, the pressure that is exerted on the dough is extremely great and this results in a considerable rise in temperature of the dough piece, which adds to the sticky condition thereof produced in the dough piece by the moisture forced from the interior thereof to the surface thereof. My invention further comprises means for cooling the dough piece after it leaves the sheeting rollers, as well as guiding and deflecting it so as to direct it to a conveyor belt or similar means forming a part of the molding mechanism.

More particularly my invention comprises means for directing sheeted dough pieces from sheeting mechanism to a conveyor belt or similar member, by providing a deflecting and guiding member with an air cushion between the same and the dough piece to hold said dough piece away from said deflecting and guiding means while at the same time cooling said sheeted piece of dough and reducing the stickiness of the surface of said sheeted piece of dough that is directed toward said deflecting means, which is the surface of said dough piece that engages with the conveyor belt or similar means forming part of the bread molding apparatus.

My invention particularly comprises a guide or deflector plate that is mounted on the discharge end of an air blast chamber to which a strong blast of air is supplied by a fan or similar member, which plate is provided with series of perforations that are so arranged and directed as to guide the sheeted dough piece away from the surface of a sheeting roller and toward a conveyor belt, said air blast being sufficient and the number of perforations or discharge outlets for the air blast being such that the dough piece is held entirely from contact with said perforated deflector plate.

It is a further purpose of my invention to provide dough deflecting means of the above mentioned character that is adjustable relative to a sheeting roller so as to be properly spaced from said sheeting roller to prevent any engagement of any parts of the deflecting means with said sheeting roller and yet be in such a position as to properly deflect and guide the sheeted dough pieces into the mechanism to which the sheeted dough pieces are fed, onto a conveyor belt or otherwise, as the case may be. The guiding means for the dough pieces in a machine in which the above referred to rollers to which dough does not adhere are used do not engage the surface of the rollers at all at any time, but are always spaced therefrom so that no scraping action whatsoever on the surface of the rollers can take place, and my improved dough deflecting means is similarly related to the roller with which it is associated, as it does not serve as a scraper, having no contact with the roller whatsoever.

Other objects and advantages of my invention will appear as the description of the drawings proceeds. I desire to have it understood, however, that I do not intend to limit myself to the particular details shown or described, except as defined in the claims.

In the drawings:

Fig. 1 is a longitudinal vertical sectional view through a portion of a bread molding machine, showing my invention applied thereto.

Figure 2:
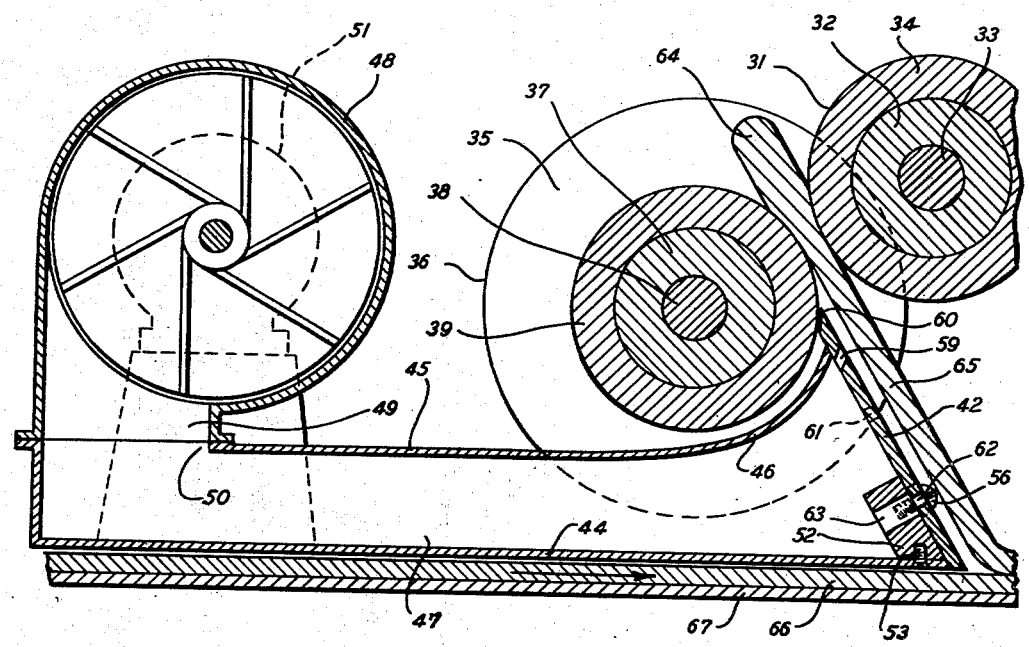
Figure 3:
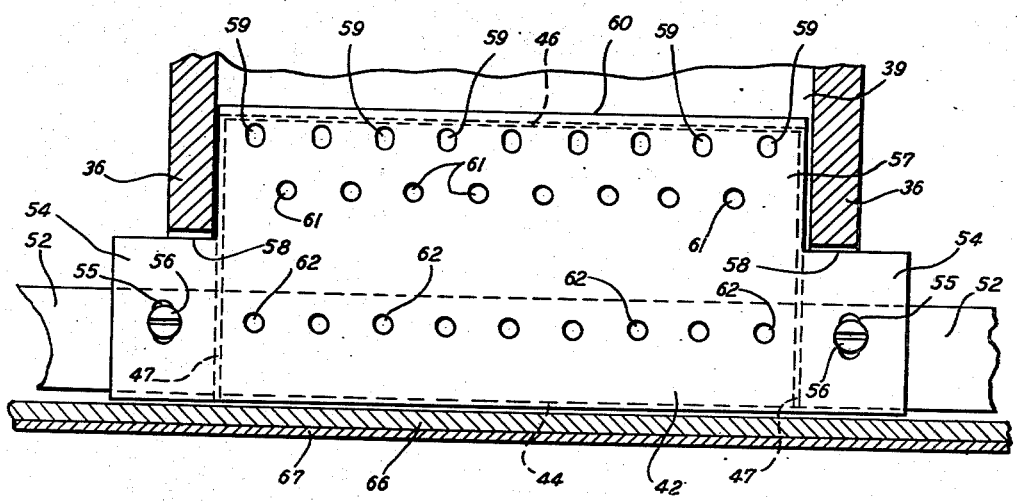

Fig. 2 is an enlarged fragmentary sectional view of said bread molding machine, showing my deflecting and guiding means applied thereto, and the means for providing the air blast for said deflecting and guiding means in vertical section, and Fig. 3 is a face view of the deflector plate, showing the arrangement of air blast openings therein, a portion of the flanged roller and conveyor belt being shown in section, the section being taken on the line 3—3 of Fig. 1, said view being on an enlarged scale.

Referring in detail to the drawings, in Fig. 1 is shown a bread molding machine having a hopper 10 to which rounded pieces of dough are fed, said hopper directing the dough pieces to a pair of sheeting rollers comprising a roller 11 that is, preferably, provided with shallow grooves 12 therein for drawing the rounded dough piece into position to be sheeted between said roller 11 and the flanged roller 13. Said rollers comprise inner steel cores 14 and 15, respectively, mounted on shafts 16 and 17, respectively, which are driven by suitable driving means in a manner to rotate said rollers in the direction indicated by the arrows in Fig. 1. The roller 11 is mounted on suitable blocks 18 that are adjustable in openings 19 in the side frame members 20 for adjustment of the roller 11 toward and away from the roller 13, the adjusting means 21 being the same as in the application of Merlin A. Sticelber, Serial No. 48,042, filed September 7, 1948, on Sheeting Mechanism for Dough Molding Machines.

The hopper has suitable guiding means for directing the dough between the pair of rollers 11 and 13, including a guide flange 22 that extends between the flanges 23 on said roller 13, and suitable guiding means comprising the guide members 24 and 25 are provided for guiding the dough pieces that have been sheeted by the rollers 11 and 13 toward the lower pair of sheeting rollers, to be described below, said guiding means being suitably mounted on transversely extending bars 26 and 27 in the same manner as in the said application of Merlin A. Sticelber, Serial No. 48,042, and having side guides 28 that are also similar to those described in said last mentioned application.

The roller 11 is provided with an outer ply or layer of a cylindrical sleeve-like character of a synthetic resin material, such as described in the application of Merlin A. Sticelber, Serial No. 793,359, above referred to, which has the shallow grooves 12 therein, and the roller 13 has an outer sleeve-like cylindrical layer or ply of said synthetic resin 30 provided thereon, the plies 29 and 30 being similarly fixed on the cores 14 and 15 to rotate therewith as a unit.

The lower pair of rollers comprises a roller 31, which is adjustable in the same manner as the roller 11, previously described, the same reference numerals being applied to the adjusting means and the adjustable mounting for said roller as to the corresponding parts of the mounting and adjusting means of the roller 11. Said roller 31 has a core portion 32 of steel, which is mounted on a shaft 33 so as to rotate therewith in the direction of the arrow shown in Fig. 1, and has an outer layer or ply 34 of the synthetic resin material above referred to, which is non-adhesive to dough, and said roller 31 is smooth faced instead of being provided with shallow grooves, as is the roller 11. Said roller 31 is of a length to fit between the flanges 35 of the other roller of the pair, the flanged roller 36 also having a steel core 37 mounted on a shaft 38 so as to rotate therewith in the direction of the arrow applied thereto in Fig. 1, and an outer smooth surfaced cylindrical ply 39 of the synthetic resin material previously referred to is provided on the roller 36 extending between the flanges 35. A guide member 40 is provided for guiding a sheeted dough piece away from the surface of the roller 31, being mounted on the rod-like member 41 in a similar manner to that in which the guide member 24 is mounted on the rod-like member 26.

My improved deflecting and guiding means is associated with the flanged roller 36. The rollers are not shown in their adjusted position in Fig. 1, being adjusted to a much closer spacing when in operation to sheet dough pieces for forming into loaves, such as for example that shown in Fig. 2 for said rollers. The spacing can be even closer than that shown in Fig. 2, if desired. The first set of rollers 11 and 13 are set further apart than the second set of rollers 31 and 36 so that the rounded piece of dough is first sheeted to a greater thickness than is the case after it passes between the rollers 31 and 36.

My improved deflecting and guiding means comprises a plate-like member 42, which is mounted on the forward or discharge end of an air blast chamber or box 43, which is shown as having a substantially flat bottom wall 44 and a top wall that has a flat portion 45 and a curved portion 46 that is curved on an arc that is substantially concentric with the curvature of the outer surface of the outer ply 39 of the roller 36, the side walls 47 being of an outline to fit between the top and bottom walls 44 and 45. Any suitable means may be provided for supplying a strong blast of air flowing toward the forward end of the air blast chamber or box toward the plate-like member 42, such as illustrated in Fig. 2, for example, comprising a fan 48, having a discharge conduit 49 connected with an inlet opening 50 leading into the duct that comprises the air blast box or chamber leading to the perforated plate 42, said fan being driven by any suitable means, such as an electric motor 51.

The rear end of the air blast chamber or conduit is supported from the fan 48. The forward end thereof is supported by means of a transversely extending bar 52, which is secured to the side walls 20 of the frame in any suitable manner, and which has the bottom wall 44 of the air blast box or chamber secured thereto by suitable securing elements 53.

The plate-like member 42 is of generally rectangular shape, except that it has a pair of laterally extending wings 54 provided thereon that are provided with slots 55, in which the securing elements 56 are mounted, said securing elements screw-threadedly engaging in threaded openings in the bar 52, this permitting adjustment of the plate-like member 42 in the direction of the length of the slots 55, or toward and away from the surface of the portion 39 of the roller 36. Said plate-like member 42 is mounted so as to have a close fit on the edge portions of the walls of the air blast chamber. The narrower portion 57 of said plate-like member 42 is slightly narrower than the distance between the flanges 35 on the roller 36, as will be obvious from Fig. 3, so that ample clearance exists between said narrower portion 57 and said flanges 36. Also the edges 58 of the wider portion of said plate-like member are spaced sufficiently from the peripheral edges of the flanges 36 to provide ample clearance between the same. Said plate-like member has a plurality of perforations therein comprising a plurality of holes 59 that extend at an oblique angle through said plate-like member 42, said holes 59 being arranged so as to be in a row transversely of the plate or parallel to the axis of rotation of the roller 36. The axes of the openings 59, however, are at an oblique angle to the inner and outer faces of the plate 42 so that the air that passes therefrom at high velocity passes in streams or jets upwardly at an oblique angle toward the surface of the roller 31 or away from the surface of the roller 36. The upper edge portion 60 of said plate-like member is beveled so as to provide a relatively sharp edge thereon, permitting said edge to be adjusted close to the surface of the ply 39 of the roller 36 and yet spaced therefrom so as to prevent any scraping engagement of said edge on said roller. The adjustment in this manner of the plate-like member 42 is obtained by means of the securing elements 56 and the slots 55 in said plate-like member 42.

A second row of holes or perforations 61 is provided in the narrower portion of the plate-like member, these thus lying between the flanges 35 on the roller, the axes of said openings 61 extending perpendicularly to the faces of the plate-like member 42. The perforations or openings 61 are staggered relative to the perforations or openings 59. Another row of perforations or openings 62 is provided, said openings 62 being staggered relative to the openings 61 and being in the wider portion of the plate-like member 42, but lying between the margins, if extended, of the narrow portions 57 of said plate-like member. Said openings 62 align with openings 63 in the bar 52 and their axes extend perpendicularly to the faces of the plate-like member 42. The number and spacing of the openings 59, 61 and 62 is only illustrative, the number thereof and the spacing thereof being variable to obtain the desired air cushioning or deflecting action that is accomplished by said openings, as explained below.

When a piece of sheeted dough 64, sheeted to the thickness shown in the upper portion of Fig. 2, passes between the rollers 31 and 36 rotating in the direction indicated by the arrows thereon in Fig. 1, it is reduced in thickness, said reduced in thickness portions 65 of said sheeted dough piece being shown in Fig. 2 after having passed from between the rollers 31 and 36 onto a conveyor belt 66. The sheeted dough piece 65 is held raised off the plate-like member 42 by the blasts of air passing from the various nozzles provided by the perforations 59, 61 and 62 so as to be directed downwardly on the conveyor belt in a direction substantially parallel to the top inclined surface of the plate-like member 42, but in spaced relation thereto, said sheeted dough piece ordinarily not contacting the surface of the plate-like member 42 at all, but being spaced therefrom, as shown in Fig. 2.

Thus as each piece of dough passes through the sheeting mechanism during its final sheeting operation from the rollers 31 and 36 it is directed obliquely downwardly at an angle of approximately 60° to the surface of the conveyor belt 66, which conveyor belt is traveling in the direction indicated by the arrow thereon in Figs. 1 and 2, said conveyor belt operating over a plate-like member 67. The dough piece thus delivered to the conveyor belt, is carried by said conveyor belt into engagement with curling mechanism or other suitable loaf forming means, the curling mechanism illustrated comprising a flexible member 68 engaging the forward edge of the dough piece as it travels along with the conveyor belt 66 to turn said edge over and the flexible member 69 engaging said dough piece with said forward edge turned over to complete the curling operation, said flexible means being mounted on any suitable support, such as the bar 70, which is adjustably mounted on standards 71, and relative to which said flexible members are adjustable, in the same manner as disclosed in the application of Merlin A. Sticelber, Serial No. 64,543, filed December 10, 1948, on Method of Molding Bread Loaves.

By providing the air jet or blast means comprising the perforated plate-like member 42 having the pairs of openings 59, 61 and 62 therein, the sheeted piece of dough, after passing between the paired sheeting rollers 36 and 31, indicated by the numeral 65 in Fig. 2, will be held away from the plate-like member 42 and prevented from sticking thereto without the application of flour or anything else to said plate-like member or to the surface of the dough piece during the sheeting operation or after said dough piece leaves the rollers 36 and 31. Also the sheeted piece of dough will be cooled by the blast of air striking the surface thereof and the thickness of the under side thereof will be somewhat reduced due to the air contacting the same, which will aid in preventing the dough piece from sticking to the conveyor belt 66, as said under surface of said dough piece engages therewith. The upper surface of the dough piece 65 will be in an extremely sticky or tacky condition, as no flour has been applied thereto during the sheeting operation or after the sheeting operation.

Accordingly when the dough piece reaches the curling means 69 the engaging or contacting surfaces of the coiled up or curled up piece of dough as it is curled up on itself will readily adhere to each other without any danger of there being any portions thereof that are kept from adhering because of coatings of flour thereon, and furthermore there will be no layers of flour coiled up or curled up in the sheeted piece of dough to provide white streaks in the finished loaf of bread. Due to the fact that the entire curled up or coiled up piece of dough will be of substantially the same texture and moistness throughout, the baked loaf of bread will be of a very even texture without any voids or flour streaks therein. Due to the air blast being applied to the lower face of the sheeted piece of dough, there will be no necessity for applying flour to the conveyor belt or preventing the dough piece from sticking to said conveyor belt. Thus the rounded piece of dough that is supplied to the sheeting mechanism can be sheeted and supplied in sheeted form without the addition of flour thereto, to the curling mechanism to be coiled up or curled up into loaf form.

What I claim is:

1. In a dough sheeting apparatus, a pair of cooperating sheeting rollers mounted to discharge a sheeted dough piece downwardly therefrom, a conveyor belt mounted below said rollers and traveling in a predetermined direction, a fan, and a conduit into which said fan discharges having an end wall located between said rollers and said belt and having air discharge openings therein directing streams of air across the space between said rollers and said belt.

2. In a dough sheeting apparatus, a pair of cooperating sheeting rollers mounted to discharge a sheeted dough piece downwardly therefrom, a conveyor belt mounted below said rollers and traveling in a predetermined direction, a fan, and a conduit into which said fan discharges having an inclined end wall located between said rollers and said belt and having air discharge openings therein directing streams of air across the space between said rollers and said belt.

3. In a dough sheeting apparatus, a pair of cooperating sheeting rollers mounted to discharge a sheeted dough piece downwardly therefrom, a conveyor belt mounted below said rollers and traveling in a predetermined direction, a fan, and a conduit into which said fan discharges having an inclined, perforated end wall located between said rollers and said belt.

4. In a dough sheeting apparatus, a pair of cooperating sheeting rollers mounted to discharge a sheeted dough piece downwardly therefrom, a conveyor belt mounted below said rollers and traveling in a predetermined direction, a fan, and a conduit into which said fan discharges having an inclined end wall located between said rollers and said belt, said end wall having a plurality of rows of perforations therein.

5. In a dough sheeting apparatus, a pair of cooperating sheeting rollers mounted to discharge a sheeted dough piece downwardly therefrom, a conveyor belt mounted below said rollers and traveling in a predetermined direction, a fan, and a conduit into which said fan discharges having an end wall located between said rollers and said belt and having air discharge openings therein directing streams of air across the space between said rollers and said belt, said end wall being adjustable relative to one of said rollers.

6. In a dough sheeting apparatus, a pair of cooperating sheeting rollers mounted to discharge a sheeted dough piece downwardly therefrom, and means for discharging streams of air into engagement with one side of said dough piece below said rollers, including means adjacent the discharge side of one of said rollers directing air streams obliquely upwardly at different angles and at spaced distances from said roller.

References Cited in the file of this patent

UNITED STATES PATENTS

| Number | Name | Date |
|---|---|---|
| 855,438 | Ebel | May 28, 1907 |
| 862,330 | Harris | Aug. 6, 1907 |
| 1,278,659 | Howe | Sept. 10, 1918 |
| 1,369,124 | Pope | Feb. 22, 1921 |
| 2,177,633 | Blackard | Oct. 31, 1939 |
| 2,245,284 | Lockwood | June 10, 1941 |
| 2,246,949 | Parsons | June 24, 1941 |
| 2,425,356 | Sticelber | Aug. 12, 1947 |

FOREIGN PATENTS

| Number | Country | Date |
|---|---|---|
| 5,825 | Great Britain | Mar. 17, 1894 |